(12) United States Patent
Lundberg et al.

(10) Patent No.: US 8,858,389 B2
(45) Date of Patent: Oct. 14, 2014

(54) VARIATOR ASSEMBLY

(75) Inventors: Philip C. Lundberg, Keego Harbor, MI (US); Shushan Bai, Ann Arbor, MI (US); Edwin T. Grochowski, Howell, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 266 days.

(21) Appl. No.: 13/359,983

(22) Filed: Jan. 27, 2012

(65) Prior Publication Data
US 2013/0196815 A1    Aug. 1, 2013

(51) Int. Cl.
*F16H 15/38*    (2006.01)

(52) U.S. Cl.
USPC .............................................. 476/40; 476/46

(58) Field of Classification Search
USPC .................... 476/10, 40, 42, 46; 74/606 R
See application file for complete search history.

(56) References Cited

U.S. PATENT DOCUMENTS

| | | | | |
|---|---|---|---|---|
| 4,960,004 A | * | 10/1990 | Hibi et al. | 476/10 |
| 5,676,618 A | * | 10/1997 | Nakano et al. | 476/10 |
| 6,117,037 A | * | 9/2000 | Yamazaki | 475/216 |
| 6,152,849 A | * | 11/2000 | Mori et al. | 476/10 |
| 6,159,126 A | * | 12/2000 | Oshidari | 476/10 |
| 7,014,588 B2 | * | 3/2006 | Miyata et al. | 476/42 |

FOREIGN PATENT DOCUMENTS

JP        6-50390      * 2/1994

* cited by examiner

*Primary Examiner* — William C Joyce

(57) ABSTRACT

A variator assembly for a transmission includes an input shaft, an input disc, an output disc, a roller, a trunnion, a piston, and a connection member. The input shaft defines an axis of rotation and the input disc is rotationally coupled to the input shaft and coaxial with the axis of rotation. The roller is disposed between the input disc and the output disc to provide a speed ratio between the input disc and the output disc. The trunnion is connected to the roller and includes a connecting feature. The piston defines a central bore. The connection member has a head portion, a shaft portion, and a connecting portion, where the connecting portion is connected to the connecting feature of the trunnion, the head portion abuts the piston, and the shaft portion is disposed in the central bore of the piston.

14 Claims, 4 Drawing Sheets

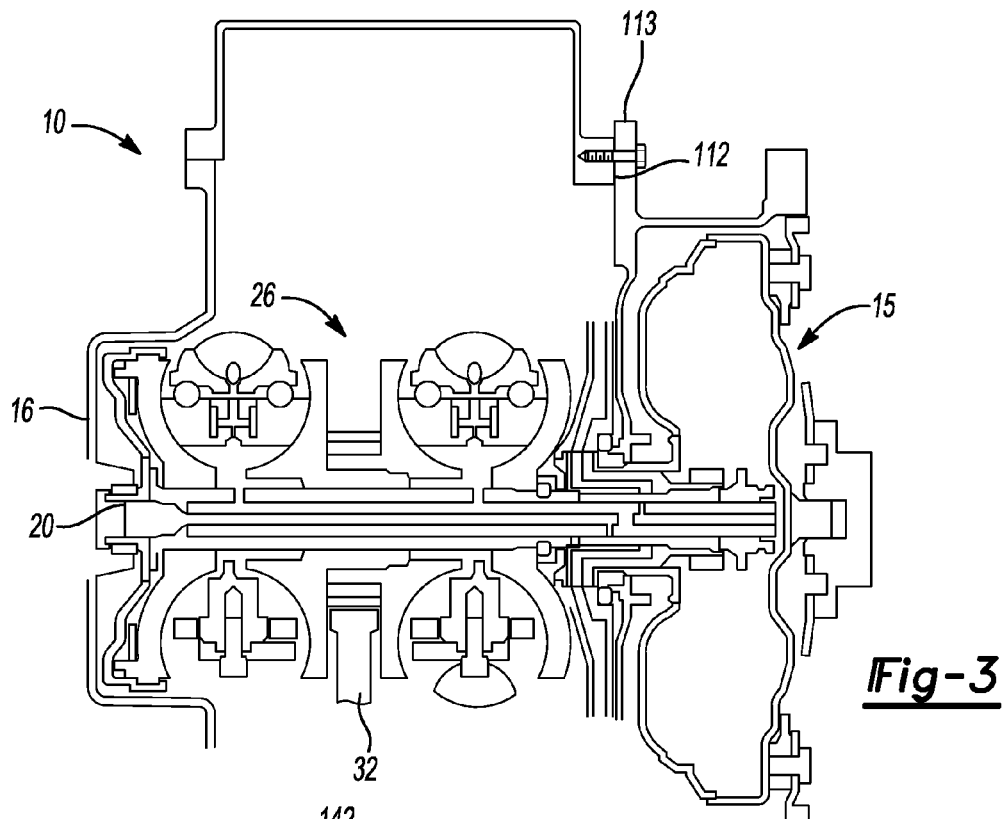
_Fig-3_
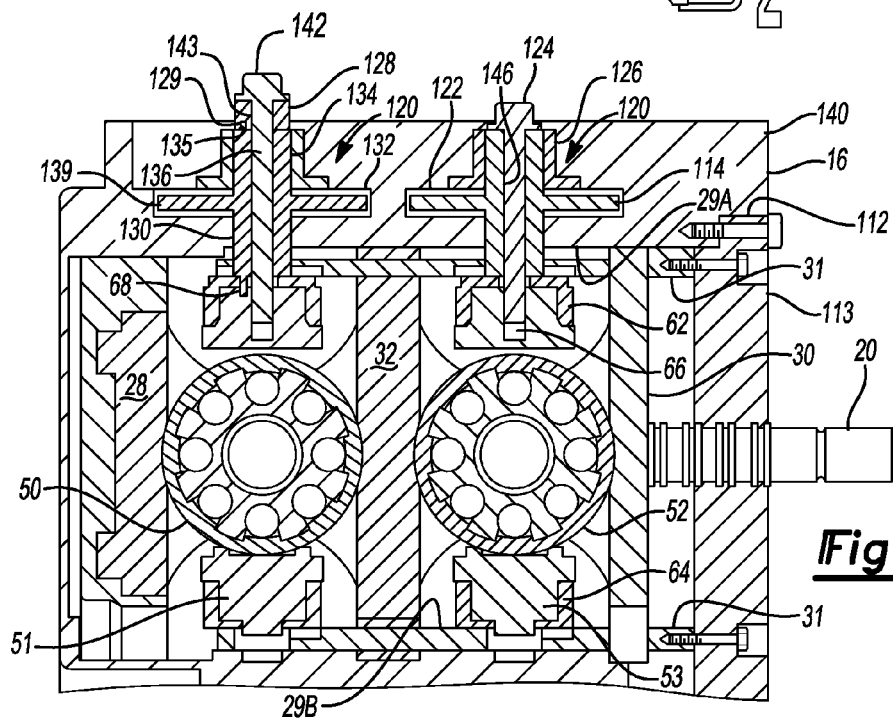
_Fig-4_

VARIATOR ASSEMBLY

FIELD

The present disclosure relates to transmission variator assemblies. More specifically, the present disclosure relates to toroidal type variator assemblies.

BACKGROUND

The statements in this section merely provide background information related to the present disclosure and may or may not constitute prior art.

A continuously variable transmission ("CVT") typically includes gearing that operatively couples a variator between a rotary power source, such as an engine or electric motor, and a final drive unit. The variator includes a rotary input disk and a rotary output disk which are able to steplessly or continuously vary the ratio of an input speed to an output speed (the "variator ratio"). The overall speed ratio provided by the CVT is a function of the variator ratio and the associated gearing. The output disc includes integrally formed gear teeth that are in mesh with and drive a corresponding gear. The gear in turn is functionally coupled to an output shaft or layshaft that is functionally coupled to the final drive unit. A typical CVT that has a toroidal variator and a torque converter is assembled into the transmission case from a direction that is perpendicular to the centerline of the variator through an opening in the transmission case. Accordingly, in order to fit the variator through the opening in the transmission case, the input shaft that connects to the torque converter is a separate component that is coupled with the variator shaft after insertion of the variator in the transmission case. Using separate components increases complexity, costs, and axial length of the assembled transmission. Therefore, there is a need in the art for a variator assembly that provides improved performance with respect to complexity of variator components and packaging.

SUMMARY

A transmission includes a transmission housing, a variator assembly, and a torque converter. The transmission housing has a valve body portion and a substantially planar surface that defines an opening. The variator assembly is disposed adjacent to the valve body portion of the transmission housing and includes a first support member, a second support member, an input shaft, an input disc, an output disc, a roller, a trunnion, and a piston. The input shaft is disposed substantially perpendicular to the substantially planar surface of the transmission housing and the input shaft defines an axis of rotation and extends axially through the opening defined by the planar surface of the transmission housing. The input disc is rotationally coupled with the input shaft and is coaxial with the axis of rotation. The output disc opposes the input disc and is coaxial with the axis of rotation. The roller is disposed between the input disc and the output disc to provide a speed ratio between the input disc and the output disc. The trunnion has a first end and a second end, where the trunnion rotatably supports the roller, the first end is pivotally supported by the first support member, and the second end is pivotally supported by the second support member. The torque converter includes a turbine that is directly rotationally coupled with the input shaft of the variator assembly.

In another aspect, the transmission further includes a housing support member having a substantially planar surface and a plurality of bearing pockets. The housing support member is attached to the transmission housing and the substantially planar surface opposes the substantially planar surface of the transmission housing.

In yet another aspect, the first and second support members of the variator assembly are fixedly attached to the housing support member.

In yet another aspect, the trunnion further includes a connecting feature and the variator assembly further includes a connection member. The valve body portion of the transmission housing further includes at least one piston bore and at least one aperture coaxial with the piston bore. The connection member has a head portion, a shaft portion, and a connecting portion, where the connecting feature is disposed on the first end of the trunnion. The connecting portion is connected to the connecting feature of the trunnion, the head portion abuts the piston, and the shaft portion is disposed in the central bore of the piston. The at least one aperture of the valve body portion of the transmission housing circumscribes the shaft portion of the connection member of the variator assembly and the piston of the variator assembly is at least partially disposed in the piston bore of the transmission housing.

In yet another aspect, the shaft portion of the connecting member and the central bore of the piston define an annulus for communicating fluid.

In yet another aspect, the trunnion further defines at least one fluid passageway in fluid communication between the roller and the annulus defined by the connection member and the piston.

In yet another aspect, the at least one fluid passageway is angled with respect to an axis of rotation of the trunnion.

In yet another aspect, the trunnion further defines a pin bore offset from an axis of rotation of the trunnion and the piston further defines a pin, and the pin of the piston is disposed in the pin bore of the trunnion.

In yet another aspect, the variator assembly further includes a cam coupled for rotation with the piston.

In yet another aspect, the piston further defines a pin bore offset from an axis of rotation of the piston and the cam further includes a pin, and the pin of the cam is disposed in the pin bore of the piston.

In yet another aspect, the connecting feature of the trunnion is a threaded bore that is coaxial with an axis of rotation of the trunnion and the connecting portion of the connection member is a threaded shaft.

In yet another aspect, the connection member is a bolt.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a top view of a variator installed in a transmission case according to the principles of the present invention;

FIG. 4 is a cutaway side view of a variator assembly in accordance with the principles of the present invention.

DETAILED DESCRIPTION

The following description is merely exemplary in nature and is not intended to limit the present disclosure, application, or uses.

Figure 1:
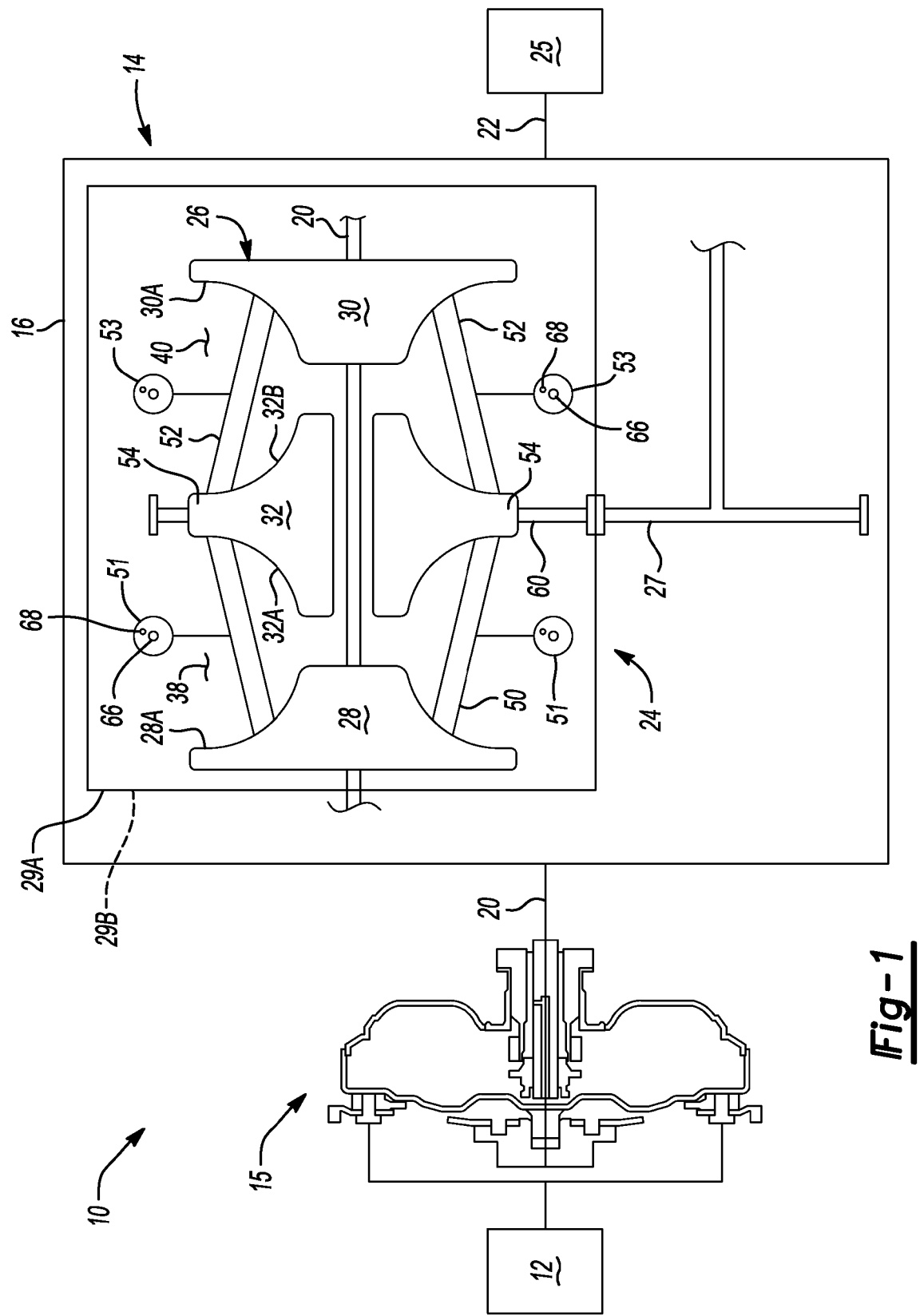
FIG. 1 is a schematic diagram of an exemplary transmission for a motor vehicle according to the principles of the present invention.

With reference to FIG. 1, a powertrain for a motor vehicle is generally indicated by reference number 10. The powertrain 10 generally includes an engine 12 interconnected with a transmission 14. The engine 12 may be a conventional internal combustion engine or an electric motor, or any other type of prime mover, without departing from the scope of the present disclosure. The engine 12 supplies a driving torque to the transmission 14 through a torque converter 15. Torque may alternatively or additionally be transferred through a flexplate (not shown), launch clutch, hydrodynamic device, or other connecting device without departing from the scope of the present invention.

The transmission 14 is a toroidal-type continuously variable transmission (CVT) or a toroidal-type infinitely variable transmission (IVT). The transmission 14 includes a typically cast, metal housing 16, which encloses and protects the various components of the transmission 14. The housing 16 includes a variety of apertures, passageways, shoulders and flanges which position and support these components. The transmission 14 generally includes an input shaft 20 and a transmission output shaft 22. The input shaft 20 is coupled for rotation with a turbine of the torque converter 15. Connected between the input shaft 20 and the transmission output shaft 22 is a gearbox 24 configured to provide forward and reverse speed or gear ratios between the input shaft 20 and the transmission output shaft 22. The input shaft 20 is functionally interconnected with the engine 12 and receives input torque or power from the engine 12. The transmission output shaft 22 is preferably connected with a final drive unit 25 which includes, for example, a propshaft, a differential assembly, and drive axles connected to wheels, etc. The transmission input shaft 20 is coupled to and provides drive torque to the gearbox 24.

The gearbox 24 generally includes one or more toroidal variators, gear sets, clutches and/or brakes, and shafts. For example, the gearbox 24 includes a variator 26 interconnected with a gear 27. The variator 26 is illustrated as a toroidal race rolling type variator. However, it should be appreciated that various other types of variators may be employed without departing from the scope of the present invention. The variator 26 includes a first input disc 28, a second input disc 30, an upper support member 29A, and a lower support member 29B. The support members 29A and 29B have threaded holes 31 for mounting the variator 26 to the housing 16.

The first input disk 28 includes a toroidal outer surface or first input race 28A and the second input disk 30 includes a toroidal outer surface or second input race 30A. Disposed between the first and second input races 28A, 30A is an output disk 32. The output disk 32 includes a toroidal outer surface or first output race 32A and a toroidal outer surface or second output race 32B. The first output race 32A is disposed opposite the first input race 28A and the second output race 32B is disposed opposite the second input race 30A. The first input race 28A and the first output race 32A cooperate to define a first toroidal cavity 38 and the second input race 30A and the second output race 32B cooperate to define a second toroidal cavity 40. Each of the disks 28, 30, and 32 share a common rotational axis defined by the input shaft 20. The input disks 28 and 30 are rotationally coupled to the input shaft 20 and transfer drive torque to the output disk 32 via a plurality of rollers 50 and 52 that are rotatably supported by a plurality of trunnions 51 and 53.

For example, the first cavity 38 includes the plurality of rollers 50 supported on the plurality of trunnions 51 and second cavity 40 includes the plurality of rollers 52 supported on the plurality of trunnions 53. Typically, each of the first and second cavities 38 and 40 include two or three rollers 50 and 52, though it should be appreciated that any number of rollers may be employed without departing from the scope of the present invention. Each of the rollers 50, 52 are mounted for rotation about a roller axis and rolls upon the toroidal races 28A, 32A, 32B, and 30A of its associated input and output disks 28, 30, and 32 to transfer drive from the input disks 28 and 30 to the output disks 32. Changes in variator drive ratio are achieved by axial translation of the trunnions 51 and 53, which cause precession of the rollers 50, 52 such that the roller's axis is able to turn to change the inclination of the roller axis relative to the variator axis. Precession of the rollers 50, 52 results in changes of the radii of the paths traced on the races 28A, 32A, 32B, and 30A by the rollers 50, 52 and hence result in a change of variator drive ratio between the input disks 28 and 30 and the output disk 32.

The output disk 32 includes a central, radially distal portion 54 disposed between the races 32A and 32B. A variator output gear 60 is coupled to the distal portion 54. The variator output gear 60 is intermeshed with the gear 27. The gear 27 is functionally interconnected with the transmission output shaft 22 and supplies drive torque from the variator 26 and variator output gear 60 to the transmission output shaft 22 and therefore the final drive unit 25.

Figure 5:
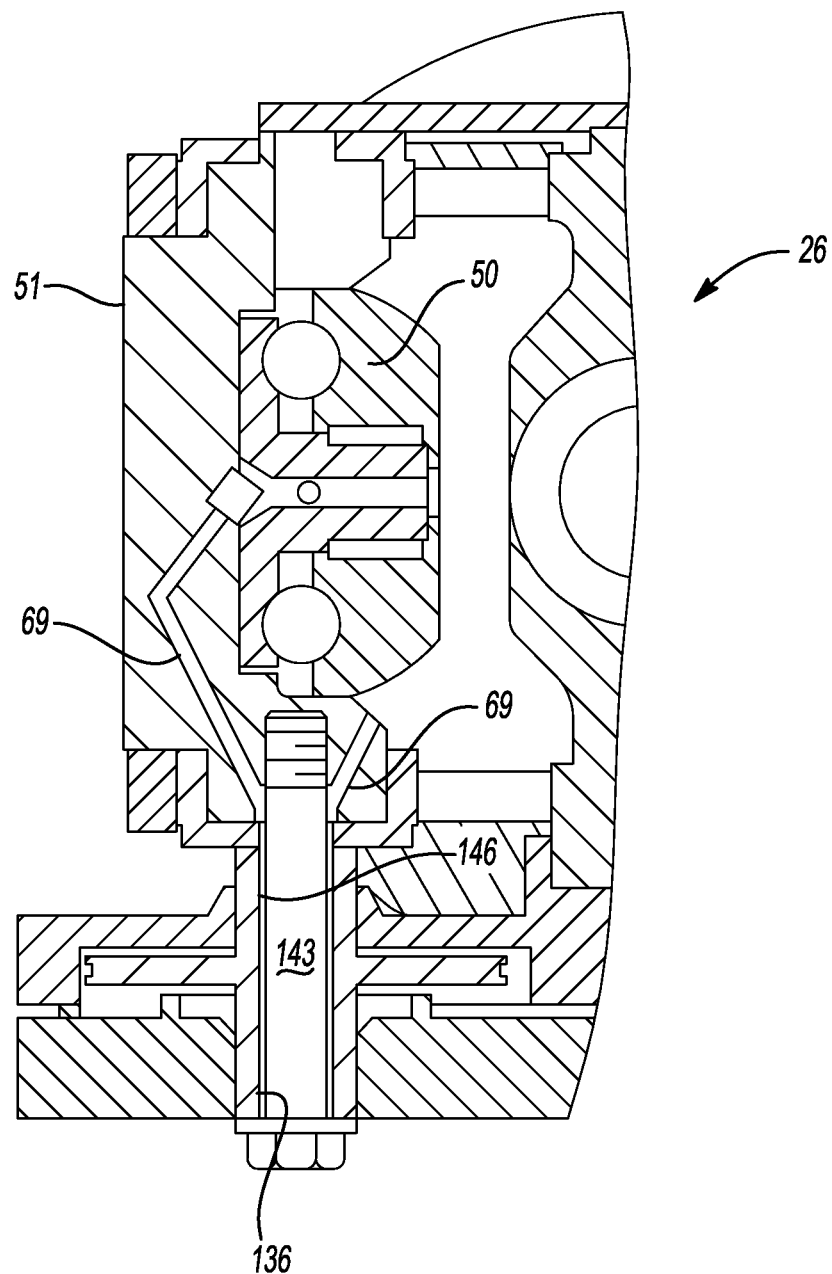
FIG. 5 is a cutaway side view of a variator assembly in accordance with the principles of the present invention.

With reference to FIG. 4, the variator assembly is shown in a side cutaway view. Each of the trunnions 51 and 53 includes a first end 62, a second end 64, a threaded bore 66, and a pin bore 68. The first end 62 is cylindrical in shape and is supported for rotation by the upper support member 29A. The second end 64 is substantially cylindrical in shape and is supported for rotation by the lower support member 29B. The threaded bore 66 is disposed in the first end 62 and is coaxial with an axis of rotation of the trunnions 51 and 53. The pin bore 68 is disposed in the first end 62 between the threaded bore 66 and an outer radius of the trunnions 51 and 53. The threaded bore 66 and the pin bore 68 cooperate with a piston assembly, as will be described below. The trunnions 51 and 53 further define fluid passageways 69, as is seen in FIG. 5. The fluid passageways are angled through the trunnions 51 and 53 from a counterbored portion of the threaded bore 66 to a portion that communicates with the rollers 50 and 52 for communicating lubrication and operating fluid to the cavities 38 and 40.

Figure 2:
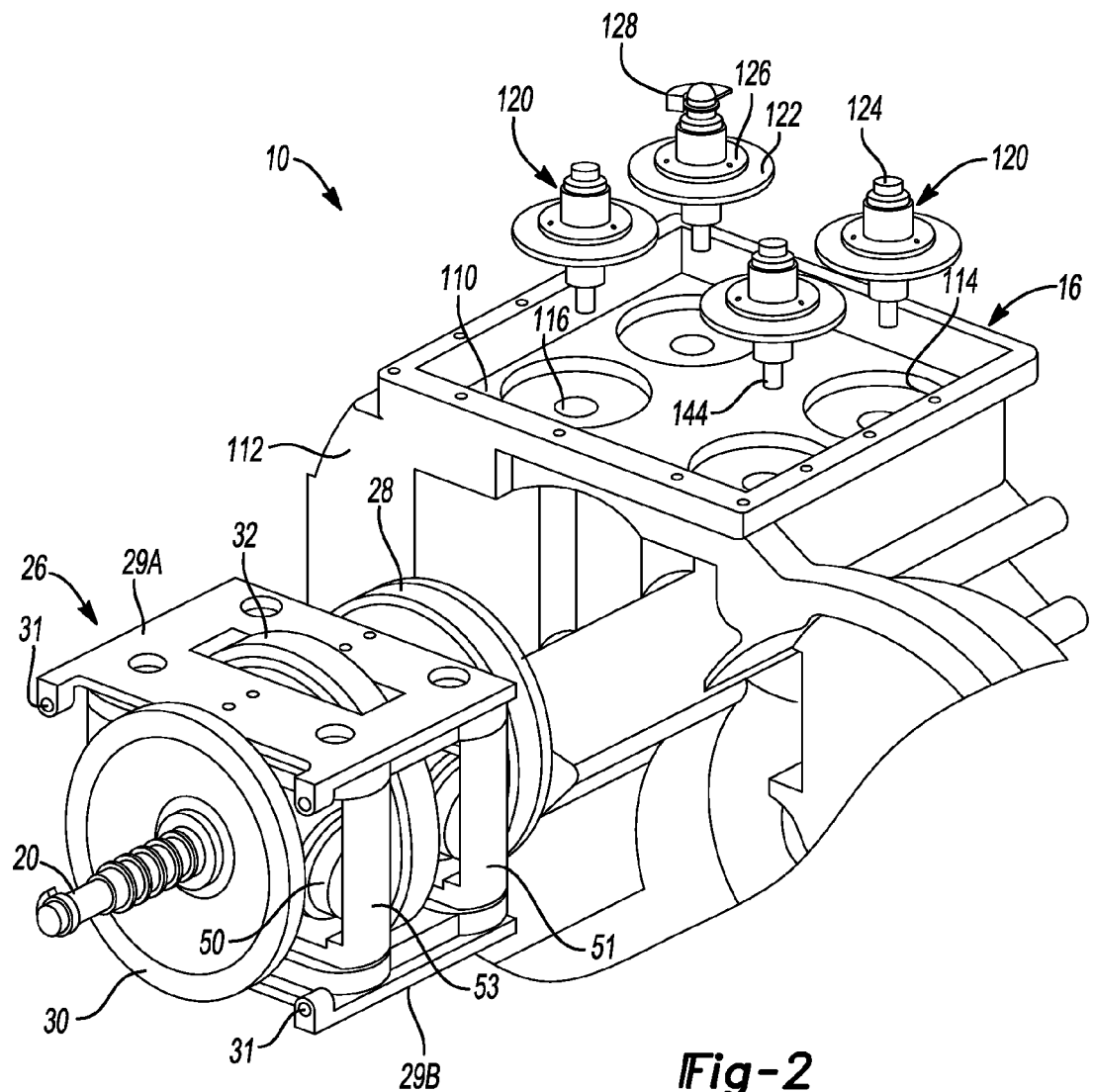
FIG. 2 is an exploded view of a variator and a transmission case according to the principles of the present invention.

With reference to FIGS. 2 and 3, the variator 26 and the housing 16 of the transmission 14 are shown in an exploded view and a top view. The housing 16 of the transmission has a valve body portion 110 and a mounting surface 112. The valve body portion 110 is a generally flat portion in which a valve body (not shown) may be installed. The valve body portion 110 defines a plurality of disc shaped grooves or piston pockets or piston bores 114 and a plurality of bore holes 116. The pockets 114 are coaxial with the bore holes 116. The mounting surface 112 is substantially planar, defines an opening through which the variator assembly is installed, and is perpendicular to the input shaft 20. Furthermore, the mounting surface 112 is perpendicular to a base of the valve body portion 110. The mounting surface 112 bolts to a separate component of the housing 16, such as a cover, support or other housing member 113.

With further reference to FIGS. 4 and 5, and with continued reference to FIG. 2, a plurality of piston assemblies 120 are shown as assembled with the variator 26 in various views. The piston assemblies 120 translate the trunnions 51 and 53 and the rollers 50 and 52 to cause a speed ratio change between the input discs 28 and 30 and the output disc 32. Each piston assembly 120 includes a piston 122, a connecting member or bolt 124, and a retaining member 126. Additionally, at least one of the piston assemblies 120 includes a cam 128 disposed between the retaining member 126 and a head of the bolt 124 to provide feedback to a hydraulic control system of the transmission. The cam 128 includes a pin bore 129, as will be described below.

The piston 122 includes a first portion 130, a second portion 132, a third portion 134, and defines a central bore 136. The first portion 130 is adjacent to the trunnions 51 and 53, is substantially cylindrically shaped, and has a pin 135 for insertion into the pin bore 68 of the trunnions 51 and 53. The second portion 132 is substantially disc shaped, has a diameter that is larger than the diameter of the first portion 130, and has a sealing portion 139. The sealing portion 139 is disposed at a radially outer portion of the second portion 132 for sealing with the piston bore 114 of the housing 16 when assembled. The second portion 132 cooperates with the piston bore 114 and a valve body base 140 to define piston chambers on both sides of the second portion 132.

The third portion 134 is cylindrically shaped and is disposed adjacent to the second portion 132. For a piston assembly 120 having a cam 128, the third portion 134 includes a pin 135 for insertion into the pin bore 129 of the cam 128 to rotatably couple the piston 122 and the cam 128.

The bolt 124 includes a head portion 142, a shaft portion 143, and a threaded end portion 144. The threaded end portion 144 fastens to the trunnions 51 and 53 by threading into the threaded bore 66 of each of the trunnions 51 and 53. The shaft portion 143 is disposed in the central bore 136 of the piston 122. The shaft portion 143 has a diameter that is smaller than a diameter of the central bore 136 to define a fluid passage or annulus 146, as is best seen in FIG. 5. The fluid passage 146 communicates lubrication and operating fluid to the cavities 38 and 40. The head portion 142 abuts the third portion 134 of the piston 122. When a cam 128 is included in the piston assembly 120, the cam is disposed between the head portion 142 of the bolt 124 and the third portion 134 of the piston 122.

The present invention offers several benefits over existing configurations. For example, separation of the trunnions and pistons enables assembly of a transmission through the bell housing portion of the transmission case, which may allow a variety of transmission power flows and configurations to be installed in the transmission. Additionally, a single drive shaft may be used and the piston bores may be integrated into the transmission housing. Such a single drive shaft and integrated piston bore configuration reduces cost, improves packaging, and reduces complexity and number of components in the transmission.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission comprising:
   a transmission housing having a valve body portion and a substantially planar surface that defines an opening;
   a variator assembly disposed adjacent to the valve body portion of the transmission housing, the variator assembly comprising:
   a first support member;
   a second support member;
   an input shaft disposed substantially perpendicular to the substantially planar surface of the transmission housing, wherein the input shaft defines an axis of rotation and extends axially through the opening defined by the planar surface of the transmission housing;
   an input disc rotationally coupled with the input shaft and coaxial with the axis of rotation;
   an output disc opposing the input disc and coaxial with the axis of rotation;
   a roller disposed between the input disc and the output disc to provide a speed ratio between the input disc and the output disc;
   a trunnion having a first end and a second end, wherein the trunnion rotatably supports the roller, the first end is pivotally supported by the first support member, the second end is pivotally supported by the second support member, and the trunnion further defines a pin bore offset from an axis of rotation of the trunnion; and
   a piston that defines a central bore and a pin, and wherein the pin of the piston is disposed in the pin bore of the trunnion; and
   a torque converter including a turbine that is directly rotationally coupled with the input shaft of the variator assembly;
   a housing support member including a substantially planar surface, wherein the housing support member is attached to the transmission housing and the substantially planar surface opposes the substantially planar surface of the transmission housing; and
   wherein the first and second support members of the variator assembly are fixedly attached to the housing support member and the valve body portion of the transmission housing further includes a plurality of piston pockets.

2. The transmission of claim 1 wherein the trunnion further includes a connecting feature and the variator assembly further includes a connection member, wherein the valve body portion includes at least one piston bore and at least one aperture coaxial with the piston bore, and wherein the connection member has a head portion, a shaft portion, and a connecting portion, wherein the connecting feature is disposed on the first end of the trunnion, and wherein the connecting portion is connected to the connecting feature of the trunnion, the head portion abuts the piston, and the shaft portion is disposed in the central bore of the piston, and wherein the at least one aperture of the valve body portion of the transmission housing circumscribes the shaft portion of the connection member of the variator assembly and the piston of the variator assembly is at least partially disposed in the piston bore of the valve body portion.

3. The transmission of claim 2 wherein the shaft portion of the connecting member and the central bore of the piston define an annulus for communicating fluid.

4. The transmission of claim 3 wherein the trunnion further defines at least one fluid passageway in fluid communication between the roller and the annulus defined by the connection member and the piston.

5. The transmission of claim 4 wherein the at least one fluid passageway is angled with respect to an axis of rotation of the trunnion.

6. The transmission of claim 2 further including a cam coupled for rotation with the piston of the variator assembly.

7. The transmission of claim 2 wherein the connecting feature of the trunnion is a threaded bore that is coaxial with an axis of rotation of the trunnion, and wherein the connecting portion of the connection member is a threaded shaft.

8. The transmission of claim 7 wherein the connection member is a bolt.

9. A transmission comprising:
a transmission housing having a valve body portion and a substantially planar surface that defines an opening;
a housing support member including a substantially planar surface, wherein the housing support member is attached to the transmission housing and the substantially planar surface of the housing support member opposes the substantially planar surface of the transmission housing
a variator assembly disposed adjacent to the valve body portion of the transmission housing, the variator assembly comprising:
a first support member bolted to the housing support member;
a second support member bolted to the housing support member;
an input shaft disposed substantially perpendicular to the substantially planar surface of the transmission housing, wherein the input shaft defines an axis of rotation and extends axially through the opening defined by the planar surface of the transmission housing;
an input disc rotationally coupled with the input shaft and coaxial with the axis of rotation;
an output disc opposing the input disc and coaxial with the axis of rotation;
a roller disposed between the input disc and the output disc to provide a speed ratio between the input disc and the output disc;
a trunnion having a first end and a second end, wherein the trunnion rotatably supports the roller, the first end is pivotally supported by the first support member, the second end is pivotally supported by the second support member, and the trunnion further defines a first pin bore offset from an axis of rotation of the trunnion; and a piston that defines a central bore and a pin, and wherein the pin of the piston is disposed in the pin bore of the trunnion; and
a torque converter including a turbine that is directly rotationally coupled with the input shaft of the variator assembly.

10. The transmission of claim 9 wherein the trunnion further includes a connecting feature and the variator assembly further includes a connection member, wherein the valve body portion includes at least one piston bore and at least one aperture coaxial with the piston bore, and wherein the connection member has a head portion, a shaft portion, and a connecting portion, wherein the connecting feature is disposed on the first end of the trunnion, and wherein the connecting portion is connected to the connecting feature of the trunnion, the head portion abuts the piston, and the shaft portion is disposed in the central bore of the piston, and wherein the at least one aperture of the valve body portion of the transmission housing circumscribes the shaft portion of the connection member of the variator assembly and the piston of the variator assembly is at least partially disposed in the piston bore of the transmission housing.

11. The transmission of claim 10 wherein the shaft portion of the connecting member and the central bore of the piston define an annulus for communicating fluid.

12. The transmission of claim 11 wherein the trunnion further defines at least one fluid passageway in fluid communication between the roller and the annulus defined by the connection member and the piston, and wherein the at least one fluid passageway is angled with respect to an axis of rotation of the trunnion.

13. The transmission of claim 10 further including a cam coupled for rotation with the piston, wherein the piston further defines a pin bore offset from an axis of rotation of the piston and the cam further includes a pin, and wherein the pin of the cam is disposed in the pin bore of the piston.

14. The transmission of claim 10 wherein the connecting feature of the trunnion is a threaded bore that is coaxial with an axis of rotation of the trunnion, and wherein the connection member is a bolt.

* * * * *